United States Patent
Goodall et al.

(10) Patent No.: US 8,321,349 B2
(45) Date of Patent: Nov. 27, 2012

(54) METHODS OF OPERATING A SELF-SERVICE CHECK DEPOSITING TERMINAL TO PROVIDE AN ACKNOWLEDGEMENT RECEIPT

(75) Inventors: Ian C. Goodall, Kitchener (CA); Robin I. G. Angus, Fife (GB)

(73) Assignee: NCR Corporation, Duluth, GA (US)

( * ) Notice: Subject to any disclaimer, the term of this patent is extended or adjusted under 35 U.S.C. 154(b) by 854 days.

(21) Appl. No.: 12/338,073

(22) Filed: Dec. 18, 2008

(65) Prior Publication Data

US 2010/0161489 A1    Jun. 24, 2010

(51) Int. Cl.
  *G06Q 40/00*    (2012.01)
(52) U.S. Cl. .................. 705/45; 705/35; 705/42
(58) Field of Classification Search .......... 705/45, 705/35, 42
  See application file for complete search history.

(56) References Cited

U.S. PATENT DOCUMENTS

| | | | | |
|---|---|---|---|---|
| 2005/0108164 A1* | 5/2005 | Salafia et al. | ............... | 705/42 |
| 2007/0022053 A1* | 1/2007 | Waserstein et al. | ........... | 705/42 |
| 2009/0287594 A1* | 11/2009 | Updike | ............................ | 705/35 |
| 2011/0089230 A1* | 4/2011 | Artino et al. | ................. | 235/379 |

* cited by examiner

*Primary Examiner* — Jagdish Patel
*Assistant Examiner* — Kevin Poe
(74) *Attorney, Agent, or Firm* — Michael Chan

(57) ABSTRACT

A method is provided of operating a self-service check depositing terminal to provide an acknowledgement receipt. The method comprises identifying a depositor, receiving one or more checks from the depositor, generating a check deposit receipt associated with the transaction, obtaining an electronic mail (email) address associated with the identified depositor, attaching the check deposit transaction receipt to the email, printing an acknowledgement receipt which contains the email address, and delivering the printed acknowledgment receipt to the depositor. In another embodiment, the printed acknowledgement receipt may contain a Uniform Resource Locator (URL) associated with the check deposit receipt.

10 Claims, 10 Drawing Sheets

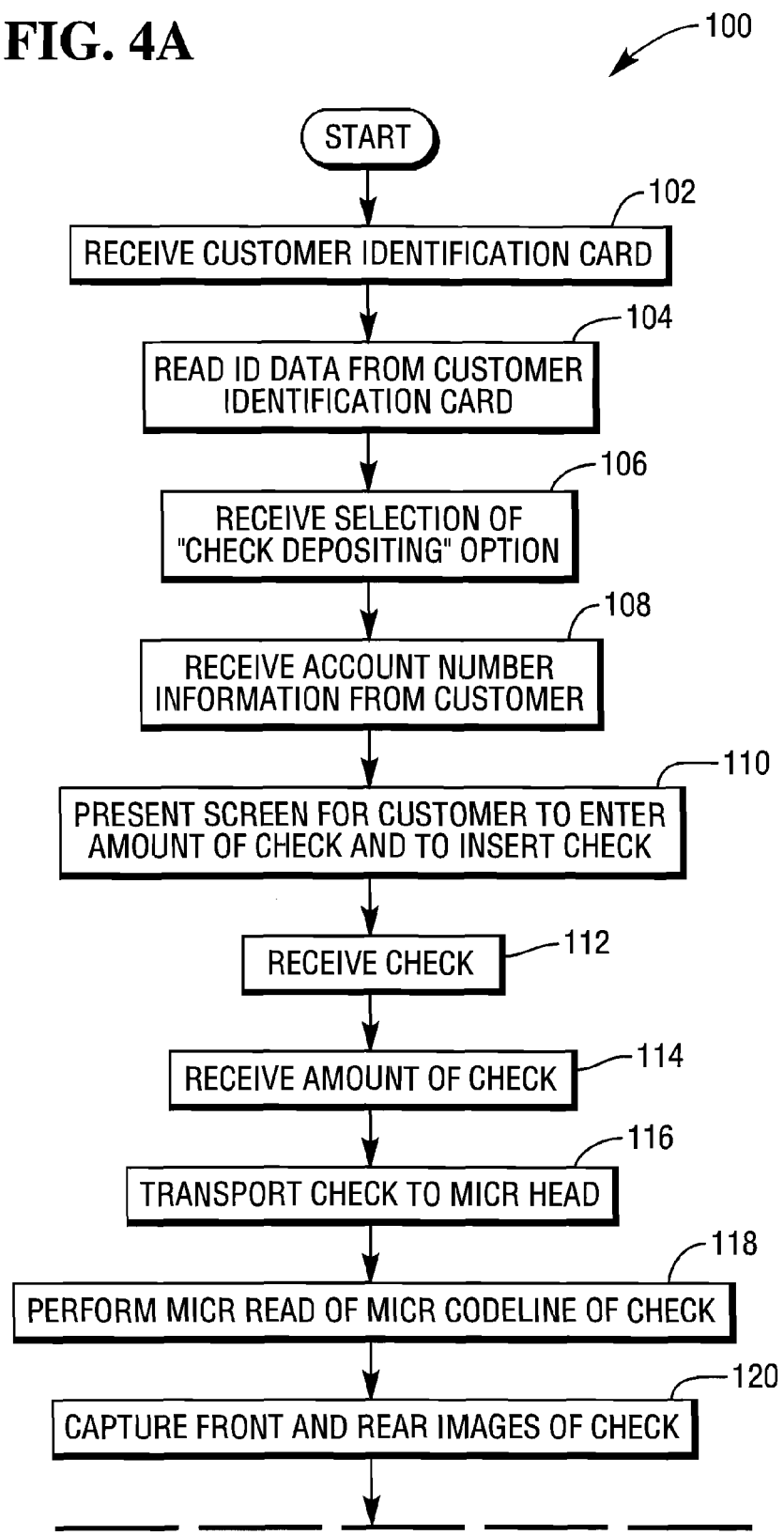

METHODS OF OPERATING A SELF-SERVICE CHECK DEPOSITING TERMINAL TO PROVIDE AN ACKNOWLEDGEMENT RECEIPT

BACKGROUND

The present invention relates to depositing of checks, and is particularly directed to methods of operating a self-service check depositing terminal, such as a check depositing automated teller machine (ATM), to provide an acknowledgment receipt.

In a typical check depositing ATM, an ATM customer is allowed to deposit a check (without having to place the check in any deposit envelope) in a publicly accessible, unattended environment. To deposit a check, the ATM customer inserts a user identification card through a user card slot at the ATM, enters the amount of the check being deposited, and inserts the check to be deposited through a check slot of a check acceptor. A check transport mechanism receives the inserted check and transports the check in a forward direction along a check transport path to a number of locations within the ATM to process the check.

If the check is not accepted for deposit, the check transport mechanism transports the check in a reverse direction along the check transport path to return the check to the ATM customer via the check slot. If the check is accepted for deposit, the amount of the check is deposited into the ATM customer's account and the check is transported to a storage bin within the ATM. An endorser printer prints an endorsement onto the check as the check is being transported to and stored in the storage bin. Checks in the storage bin within the ATM are periodically picked up and physically transported via courier to a back office facility of a financial institution for further processing or storage.

A check deposit transaction receipt is then printed and dispensed to the ATM customer. Some check deposit transaction receipts contain an image of the check which has just been deposited. If a multiple number of checks have been deposited in the transaction, the receipt may contain images of all of the checks which have been deposited. If the receipt contains images of many checks, the receipt may take a relatively long time to print. It would be desirable to provide alternative methods of providing such check deposit transaction receipts.

SUMMARY

In accordance with one aspect of the present invention, a method is provided of operating a self-service check depositing terminal to provide an acknowledgement receipt. The method comprises identifying a depositor, receiving one or more checks from the depositor, generating a check deposit receipt associated with the transaction, obtaining an electronic mail (email) address associated with the identified depositor, attaching the check deposit transaction receipt to the email, printing an acknowledgement receipt which contains the email address, and delivering the printed acknowledgment receipt to the depositor.

In accordance with another aspect of the present invention, a method is provided of operating a self-service check depositing terminal to provide an acknowledgement receipt. The method comprises identifying a depositor, receiving one or more checks from the depositor, generating a check deposit transaction receipt associated with the transaction, storing the check deposit transaction receipt in a Web server, obtaining a Uniform Resource Locator (URL) associated with the check deposit transaction receipt stored in the Web server, printing an acknowledgement receipt which contains the URL, and delivering the printed acknowledgment receipt to the depositor.

In accordance with yet another aspect of the present invention, a method is provided of operating a self-service check depositing terminal. The method comprises identifying a depositor, receiving one or more checks from the depositor, generating a check deposit transaction receipt associated with the transaction, presenting a screen to the depositor to enable the depositor to select a delivery channel for receiving the check deposit transaction receipt, and delivering the check deposit transaction receipt to the depositor via the selected delivery channel.

In accordance with still another aspect of the present invention, a method is provided of operating a self-service check depositing terminal. The method comprises identifying a depositor, receiving one or more checks from the depositor, generating a check deposit transaction receipt associated with the transaction, based upon the identified depositor, identifying a delivery channel for delivering the check deposit transaction receipt to the depositor, and delivering the check deposit transaction receipt to the depositor via the identified delivery channel.

DETAILED DESCRIPTION

Figure 1:
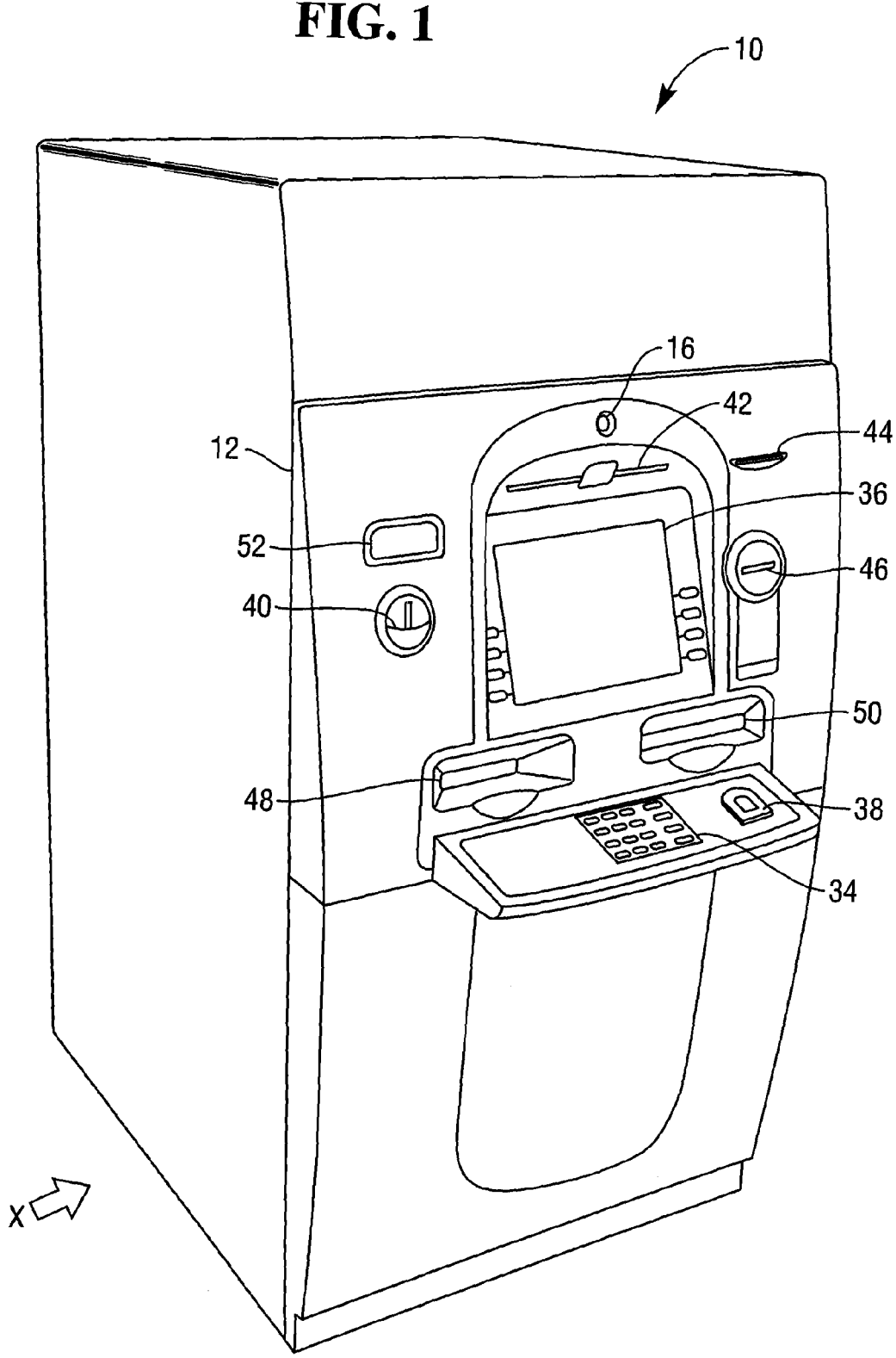
FIG. 1 is a left-front perspective view of an image-based check depositing automated teller machine (ATM) embodying the present invention.

Referring to FIG. 1, a self-service check depositing terminal in the form of an image-based check depositing automated teller machine (ATM) 10 is illustrated. The check depositing ATM 10 comprises a fascia 12 coupled to a chassis (not shown). The fascia 12 defines an aperture 16 through which a camera (not shown) images a customer of the ATM 10. The fascia 12 also defines a number of slots for receiving and dispensing media items, and a tray 40 into which coins can be dispensed. The slots include a statement output slot 42, a receipt slot 44, a card reader slot 46, a cash slot 48, another cash slot 50, and a check input/output slot 52. The slots 42 to 52 and tray 40 are arranged such that the slots and tray align with corresponding ATM modules mounted within the chassis of the ATM 10.

The fascia 12 provides a user interface for allowing an ATM customer to execute a transaction. The fascia 12 includes an encrypting keyboard 34 for allowing an ATM customer to enter transaction details. A display 36 is provided for presenting screens to an ATM customer. A fingerprint reader 38 is provided for reading a fingerprint of an ATM customer to identify the ATM customer. The user interface features described above are all provided on an NCR PERSONAS (trademark) 6676 ATM, available from NCR Financial Solutions Group Limited, Discovery Centre, 3 Fulton Road, Dundee, DD2 4SW, Scotland.

Figure 2:
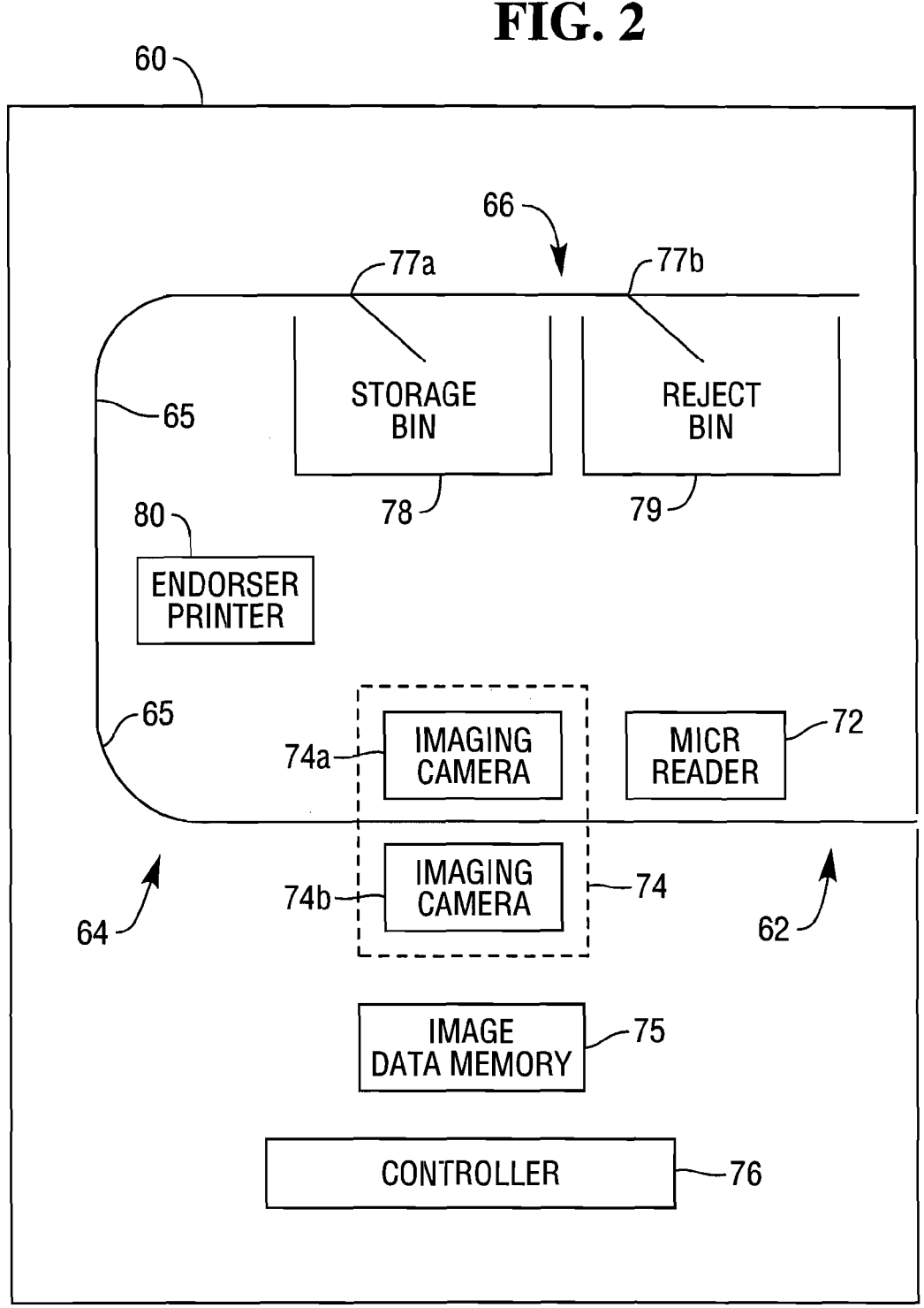
FIG. 2 is a simplified schematic diagram of a part (a check processing module) of the ATM of FIG. 1.
Figure 3:
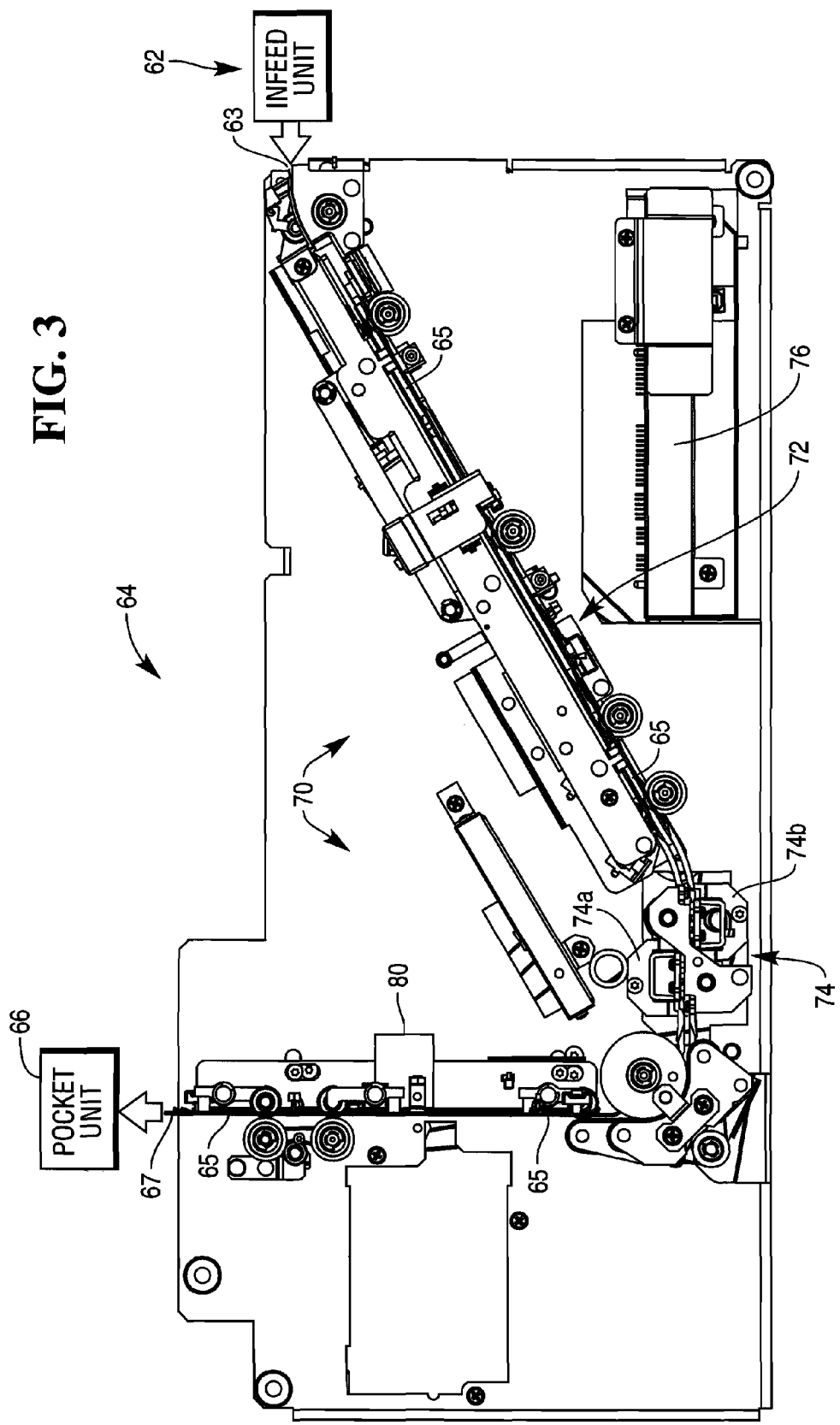
FIG. 3 is an elevational view of the check processing module of FIG. 2, looking approximately in the direction of arrow X in FIG. 1, and showing some parts removed and some parts only schematically.

A check processing module (CPM) 60 will now be described with reference to FIG. 2 and FIG. 3. FIG. 2 is a simplified schematic diagram of part of the fascia 12 and main parts of the CPM 60. FIG. 3 is an elevational view of the check processing module of FIG. 2, looking approximately in the direction of arrow X in FIG. 1, and showing some parts removed and some parts only schematically. The CPM 60 is a modified version of a conventional check processing module, such as the check processing module provided with the PERSONAS (trademark) 6676 NCR ATM.

The CPM 60 comprises three main units which includes an infeed unit 62, a transport unit 64, and a pocket unit 66. The infeed unit 62 receives a check which has been deposited into the check input/output slot 42, and transports the check to an inlet 63 of the transport unit 64. The dimensions of the infeed unit 62, such as its run length, may vary depending upon the particular model ATM the CPM 60 is installed. The structure and operation of the infeed unit 62 are conventional and well known and, therefore, will not be described.

The transport unit 64 includes a check input/output transport mechanism 70 which includes an alignment mechanism for aligning a check. The transport mechanism 70 receives a check from the inlet 63, and transports the check along a document track 65 to an outlet 67 of the transport unit 64. The transport unit 64 further includes a magnetic ink character recognition (MICR) head 72 for reading magnetic details on a code line of a check. The transport unit 64 also includes an imager 74 including an upper 74a and lower 74b imaging camera for capturing an image of each side of a check (front and rear). An endorser printer 80 is provided for printing endorsements onto checks. An image data memory 75 is provided for storing images of checks. A controller 76 is provided for controlling the operation of the elements within the CPM 60.

The pocket unit 66 includes a storage bin 78 for storing processed checks. The pocket unit 66 further includes a reject bin 79 for storing rejected checks. Two divert gates 77a, 77b are provided for diverting checks to either the storage bin 78 or the reject bin 79. The structure and operation of the pocket unit 66 are conventional and well known and, therefore, will not be described.

Figure 4B:
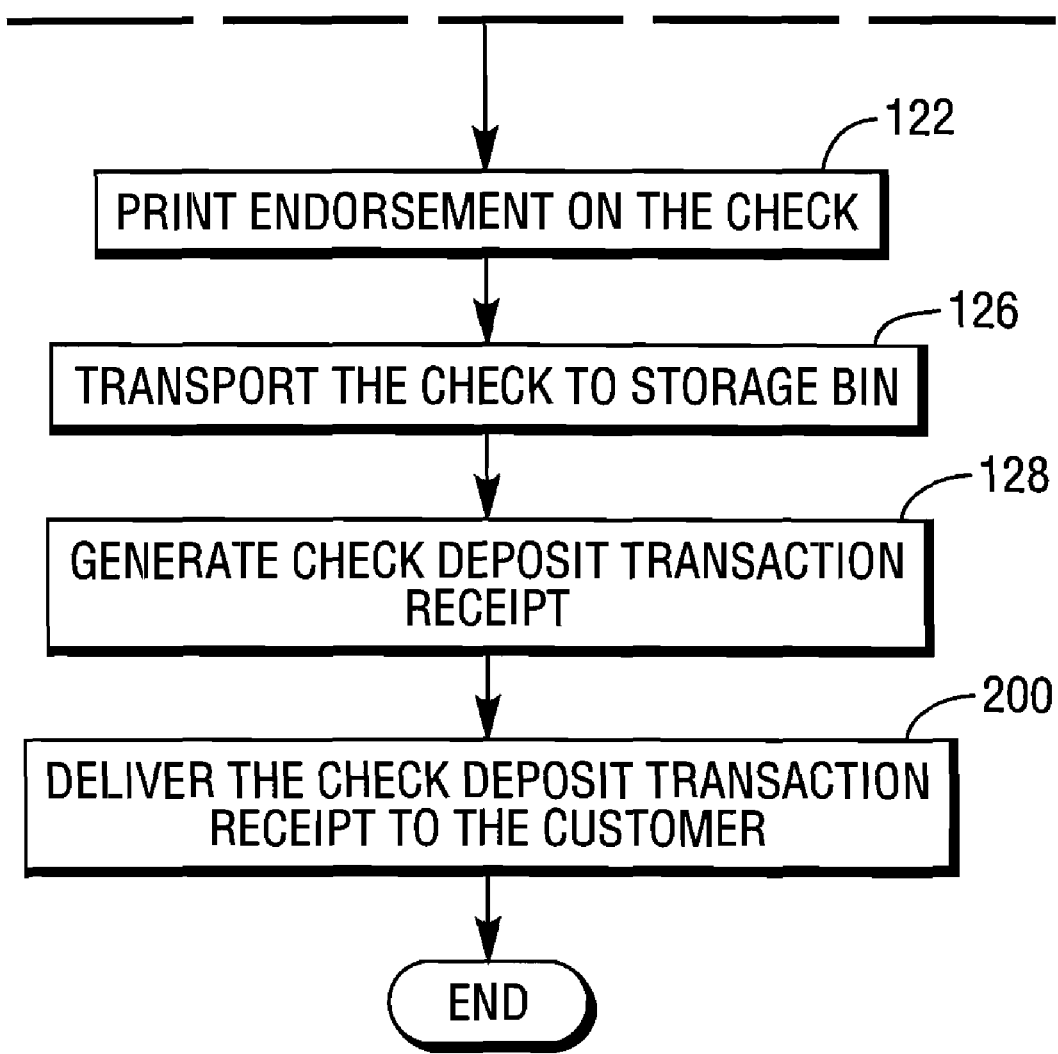
FIG. 4 is a flowchart illustrating steps involved in a check deposit transaction.

Referring to FIG. 4, a flowchart 100 illustrates steps involved in a check deposit transaction. In the check deposit transaction, the ATM customer inserts a customer identification card into the card reader slot 46 and enters identifying data, like a personal identification number (PIN) to start the transaction (steps 102 and 104). The ATM customer is presented with a screen on the display 36 to select a transaction from a list of transaction options, and selects the "check depositing" option (step 106). The ATM customer also selects an account into which the deposit is to be made (step 108).

The ATM customer is presented with a screen to enter the amount of the check via the keyboard 34, and to insert the check to be deposited through the check input/output slot 52 (step 110). The ATM customer inserts the check (step 112), and enters the amount of the check (step 114). The controller 76 receives the amount of the check. The infeed unit 62 receives the check and transports the check to the inlet 63 of the transport unit 64. The transport mechanism 70 of the transport unit 64 receives the check and transports the check (step 116) to the MICR head 72 where the MICR codeline on the check is read (step 118).

The transport mechanism 70 transports the check to the imager 74, where both sides of the check are imaged (step 120). The endorser printer 80 prints endorsement data onto the check (step 122). The endorsed check is then transported through the outlet 67 to the storage bin 78 of the pocket unit 66 (step 126) for subsequent collection and further processing. After the check is transported to the storage bin 78, a check deposit transaction receipt is generated (step 200). The check deposit transaction receipt is then delivered to the customer (202).

Figure 5:
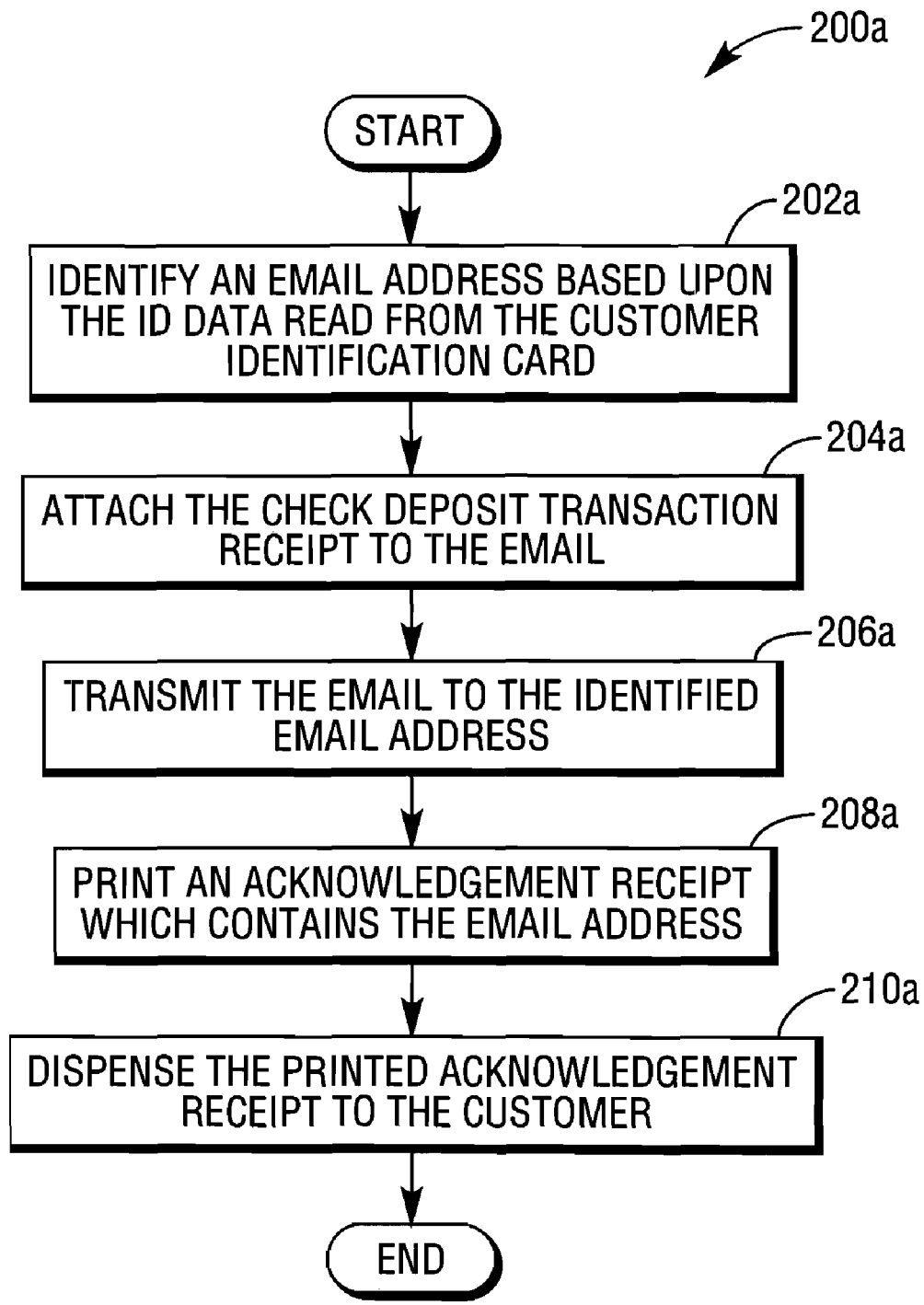
FIG. 5 is a flowchart illustrating sub-steps, in accordance with one aspect of the present invention, of a specific step in the flowchart of FIG. 4.
Figure 6:
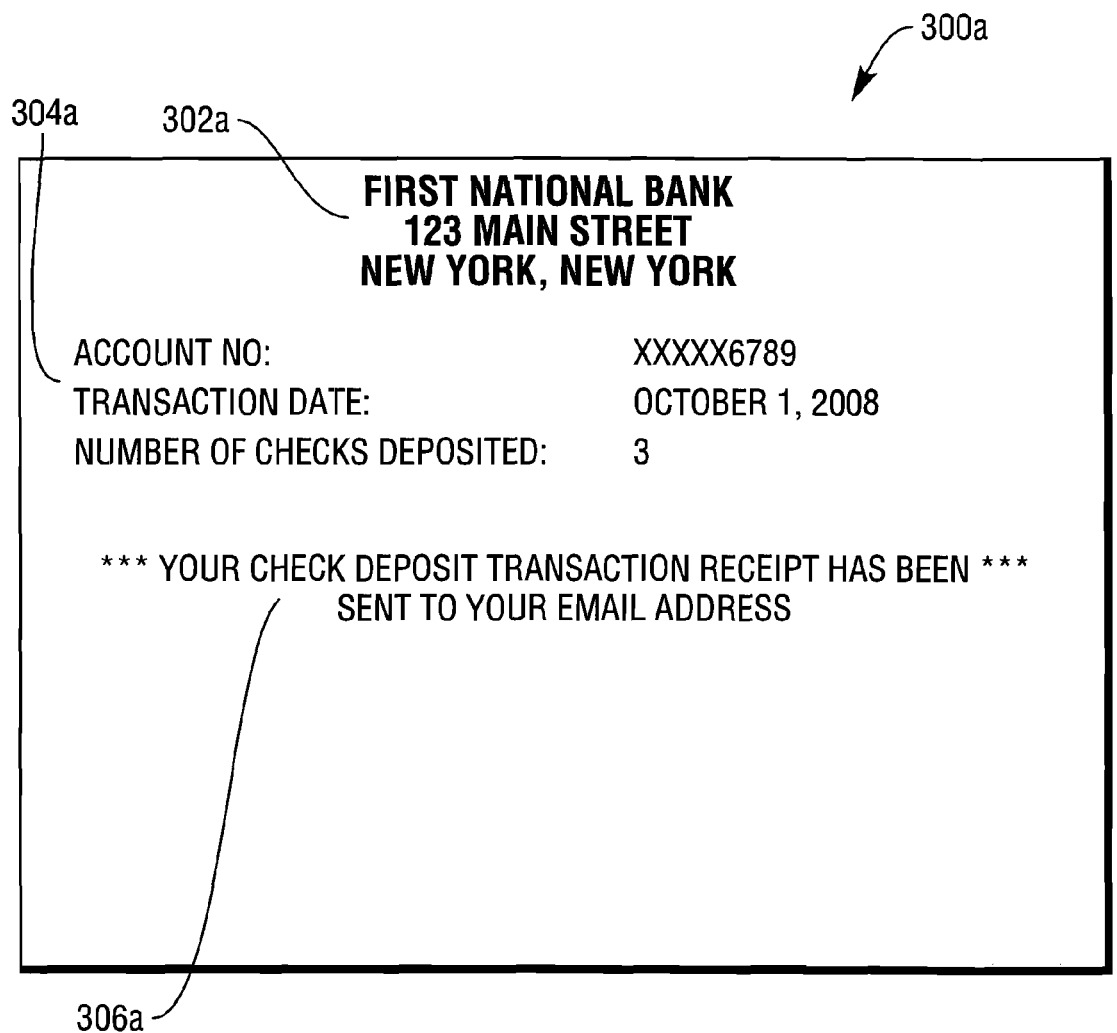
FIG. 6 is an illustration of an acknowledgement receipt generated from the flowchart of FIG. 5.

In accordance with one aspect of the present invention, sub-steps of step 200 (i.e., the step of generating a check deposit transaction receipt) of FIG. 5 are illustrated in a flowchart 200a shown in FIG. 6. As shown in sub-step 202a of FIG. 6, an electronic mail ("email") address is identified based upon the ID data read from the customer identification card back in step 104 of FIG. 4. This email address may be any type and is associated with the ATM customer. For example, the email address may be a personal home email address of the ATM customer. As another example, the email address may be an email address of a personal mobile device such as a mobile telephone. In the case of a mobile telephone, it could be generation of an MMS (versus SMS) message with an attached PDF or list of images, for example.

The check deposit transaction receipt which was generated back in step 128 of FIG. 4 is then attached to an email (step 204a). The attached receipt may be in any suitable format, such as a PDF attachment, for example. This email is sent to the email address identified back in step 202a (step 206a).

An "acknowledgement receipt" is then prepared and printed (step 208a). The printed acknowledgement receipt is then dispensed to the ATM customer (210a). An example of the printed acknowledgement receipt is shown in FIG. 6 and designated with reference numeral "300a". The acknowledgement receipt 300a has a field 302a which contains information about the bank at which the check deposit transaction is being conducted. The acknowledgement receipt 300a may also have a field 304a which contains particulars relating to the check deposit transaction. As shown in FIG. 6, the particulars of the check deposit transaction may include the account number to which the checks were deposited, the transaction date, and the total number of checks deposited.

The acknowledgement receipt 300a shown in FIG. 6 also has a field 306a which contains a statement "YOUR CHECK DEPOSIT TRANSACTION RECEIPT HAS BEEN SENT TO YOUR HOME EMAIL ADDRESS". This statement notifies the ATM customer that the check deposit transaction receipt has been sent to an email address (which, in this example, has been sent to the home email address of the ATM customer). The ATM customer can then later open up the check transaction receipt and print it out when the ATM customer checks his/her email.

Figure 7:
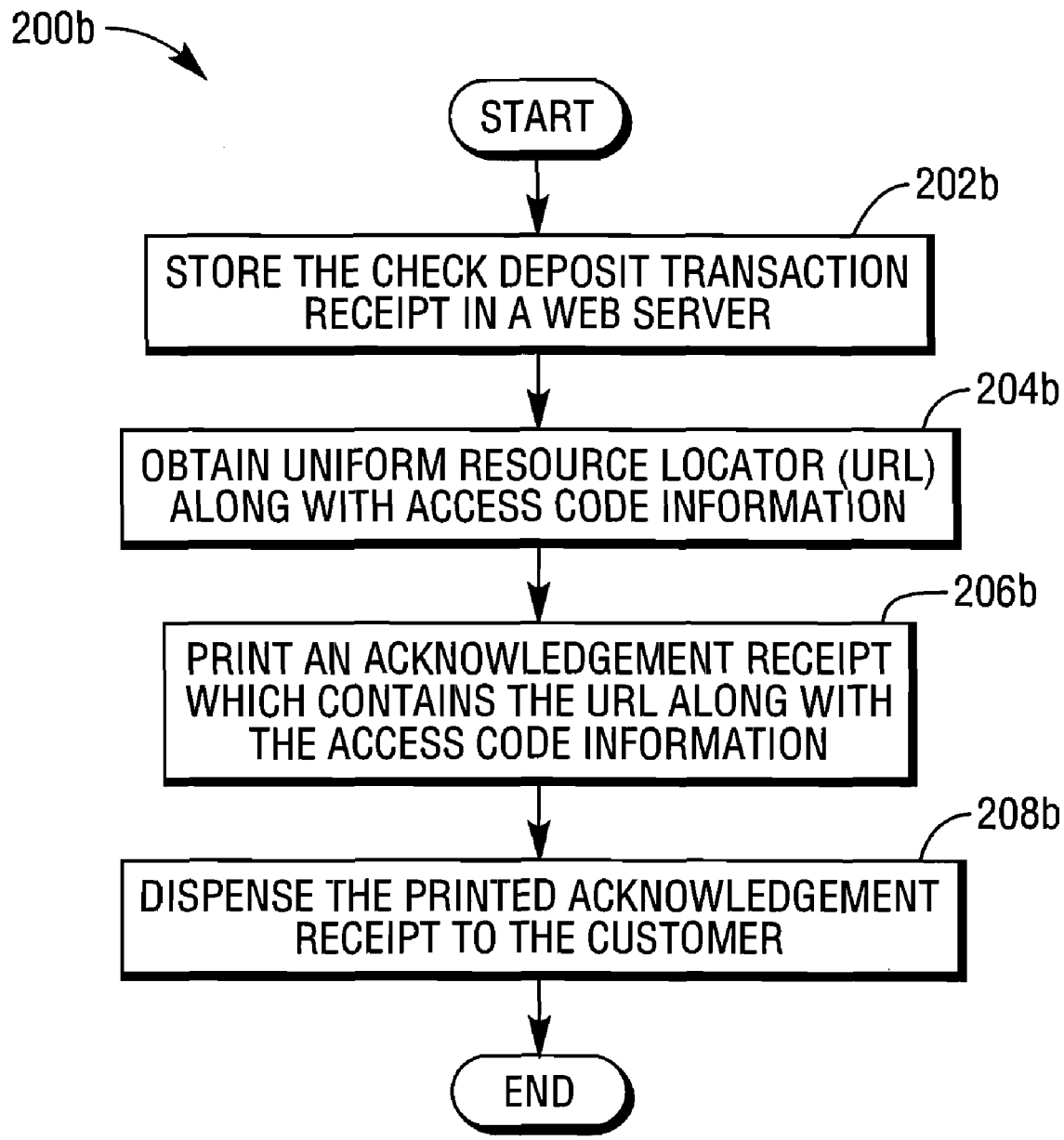
FIG. 7 is a flowchart similar to the flowchart of FIG. 5 and illustrating sub-steps, in accordance with a second aspect of the present invention, of the specific step in the flowchart of FIG. 4.

In accordance with another aspect of the present invention, sub-steps of step 200 of FIG. 4 are illustrated in a flowchart 200b shown in FIG. 7. As shown in sub-step 202b of FIG. 7, the check deposit transaction receipt is stored in a Web server. Then in step 204b, a Uniform Resource Locator ("URL") is obtained along with associated access code information. The access code information instructs and enables a user of the URL to obtain the check deposit transaction receipt which is stored in the Web server.

Figure 8:
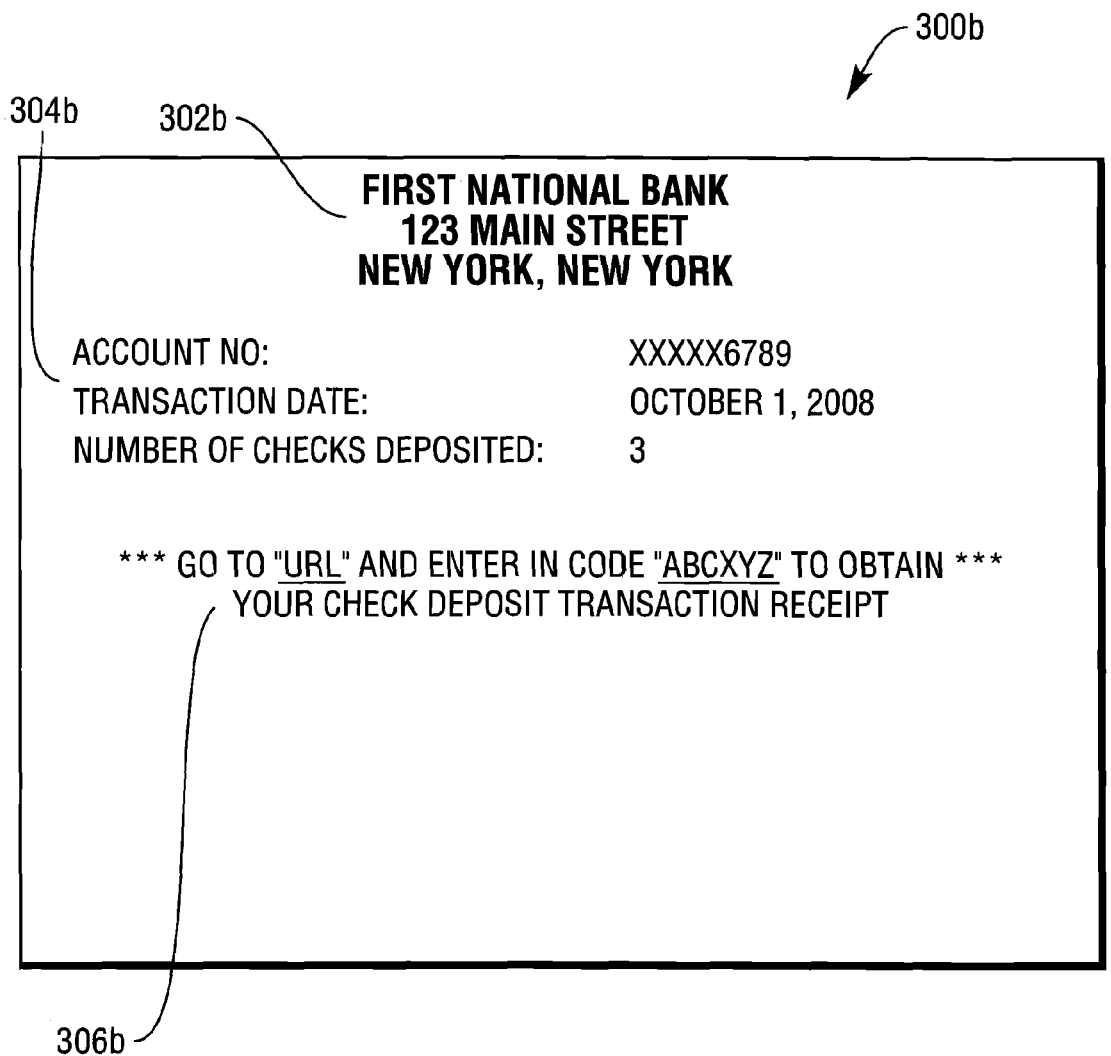
FIG. 8 is an illustration of an acknowledgement receipt generated from the flowchart of FIG. 7.

An "acknowledgement receipt" is then prepared and printed (step 206b). The printed acknowledgement receipt is then dispensed to the ATM customer (208b). An example of the printed acknowledgement receipt is shown in FIG. 8 and designated with reference numeral "300b". The acknowledgement receipt 300b has a field 302b which contains information about the bank at which the check deposit transaction is being conducted. The acknowledgement receipt 300b may also have a field 304b which contains particulars relating to the check deposit transaction. As shown in FIG. 8, the particulars of the check deposit transaction may include the account number to which the checks were deposited, the transaction date, and the total number of checks deposited.

The acknowledgement receipt 300b shown in FIG. 8 also has a field 306b which contains a statement "GO TO 'URL' AND ENTER IN CODE 'ABCXYZ' TO OBTAIN YOUR CHECK DEPOSIT TRANSACTION RECEIPT". This statement instructs and informs the ATM customer where to go on the Web and what access code to enter to obtain a copy of the check deposit transaction receipt which has been stored in the Web server.

Figure 9:
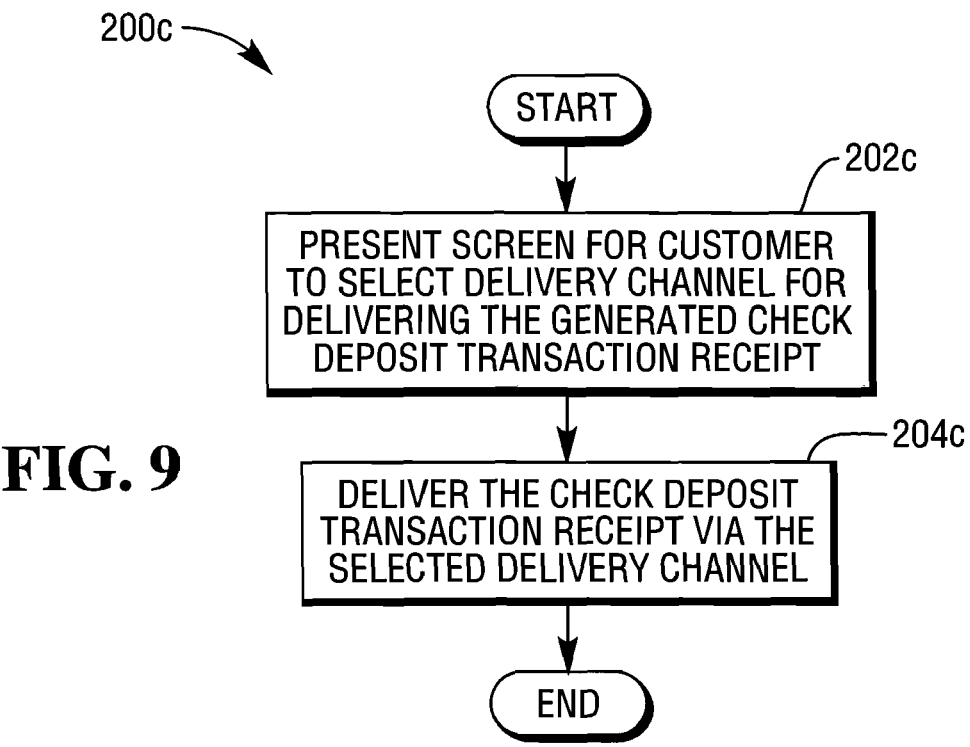
FIG. 9 is a flowchart similar to the flowchart of FIG. 5 and illustrating sub-steps, in accordance with a third aspect of the present invention, of the specific step in the flowchart of FIG. 4.

In accordance with yet another aspect of the present invention, sub-steps of step 200 of FIG. 5 are illustrated in a flowchart 200c shown in FIG. 9. As shown in sub-step 202c of FIG. 9, a screen is presented to the ATM customer to enable the ATM customer to select a delivery channel for delivering the check deposit transaction receipt which was generated back in step 128 of FIG. 4. Different delivery channels may include the mode by email or the mode by URL as described hereinabove. Then in step 204c, the check deposit transaction receipt is delivered to the ATM customer via the selected delivery channel.

Figure 10:
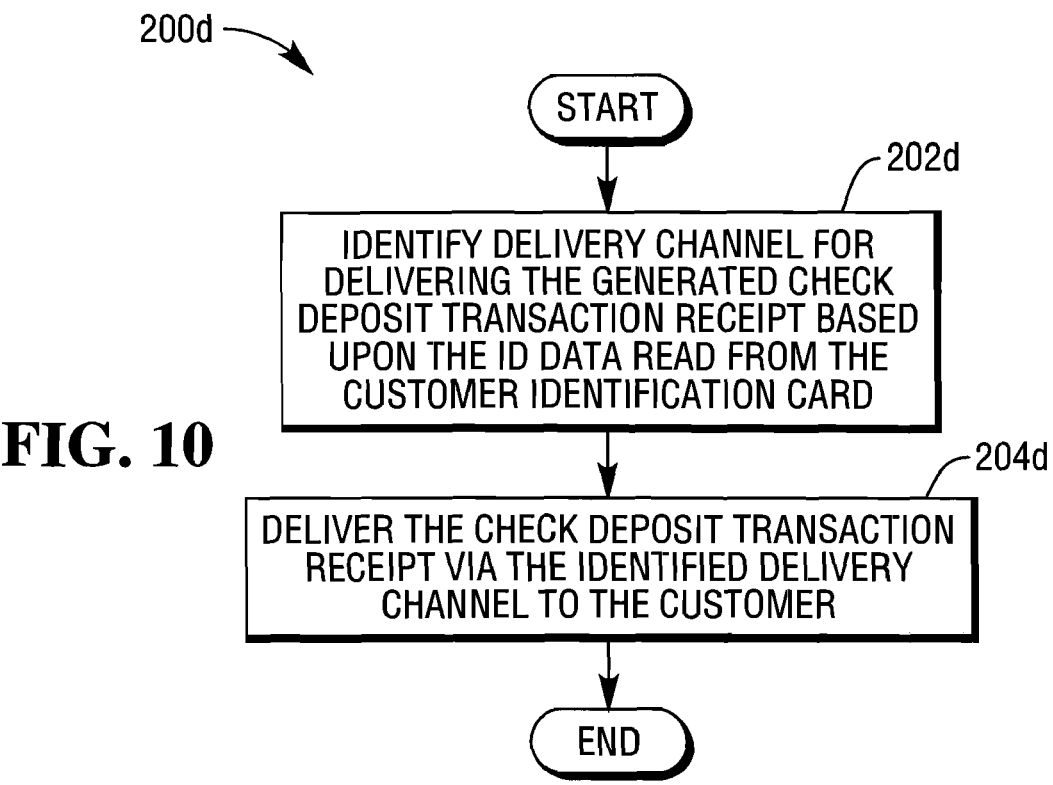
FIG. 10 is a flowchart similar to the flowchart of FIG. 5 and illustrating sub-steps, in accordance with a fourth aspect of the present invention, of the specific step in the flowchart of FIG. 4.

In accordance with yet another aspect of the present invention, sub-steps of step 200 of FIG. 4 are illustrated in a flowchart 200d shown in FIG. 9. As shown in sub-step 202d of FIG. 10, a delivery channel for delivering the generated check deposit transaction receipt to the ATM customer is identified. The delivery channel identified is based upon the customer ID data which was read from the customer ID card back in step 104 of FIG. 4. Then in step 204d, the check deposit transaction receipt is delivered to the ATM customer via the identified delivery channel. The identified delivery channels may include the mode by email or the mode by URL, both described hereinabove.

A number of advantages result when an acknowledgement receipt, instead of a check deposit transaction receipt, is dispensed to the ATM customer at the ATM. One advantage is that the need for an ATM to provide a relatively large check deposit transaction receipt at the ATM has been eliminated. The printing of a relatively large check deposit transaction receipt at the ATM takes a fair amount of time to print, especially check deposit transaction receipts which contain check images on the receipt. Accordingly, queue times and customer wait times at the ATM are reduced.

Also, since the printing of relatively large receipts has been eliminated, ATM printer usage is reduced. A result is reduced hardware failure rates. Another result is improved product life for the ATM printer.

Still another advantage is that there is less paper usage at the ATM. Accordingly, consumable costs and paper waste are reduced. Littering in the vicinity of the ATM is also reduced, resulting in environmental benefits.

Although the above-description describes the PERSONAS (trademark) 6676 NCR ATM embodying the present invention, it is conceivable that other models of ATMs, other types of ATMs, or other types of self-service check depositing terminals may embody the present invention. Self-service depositing terminals are generally public-access devices that are designed to allow a user to conduct a check deposit transaction in an unassisted manner and/or in an unattended environment. Self-service check depositing terminals typically include some form of tamper resistance so that they are inherently resilient.

The particular arrangements disclosed are meant to be illustrative only and not limiting as to the scope of the invention. From the above description, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of operating a self-service check depositing terminal to provide an acknowledgement receipt for a depositor conducting a check deposit transaction at the self-service check depositing terminal, the method of the self-service check depositing terminal comprising:
   receiving, by the self-service check depositing terminal, one or more checks from the depositor;
   generating, by the self-service check depositing terminal, a check deposit transaction receipt associated with the check deposit transaction;
   obtaining, by the self-service check depositing terminal, an electronic mail (email) address associated with the depositor;
   printing, by the self-service check depositing terminal, an acknowledgement receipt which contains a notification that the check deposit transaction receipt has either been sent or will be sent in an email to the email address associated with the depositor; and
   delivering, by the self-service check depositing terminal, the printed acknowledgment receipt to the depositor at the self-service check depositing terminal to notify the depositor that the check deposit transaction receipt has either been sent or will be sent in an email to the email address associated with the depositor.

2. A method of the self-service check depositing terminal according to claim 1, wherein the acknowledgment receipt contains information about the check deposit transaction.

3. A method of operating a self-service check depositing terminal to provide an acknowledgement receipt for a depositor conducting a check deposit transaction at the self-service check depositing terminal, the method of the self-service check depositing terminal comprising:
   receiving, by the self-service check depositing terminal, one or more checks from the depositor;
   generating, by the self-service check depositing terminal, a check deposit transaction receipt associated with the check deposit transaction;
   storing, by the self-service check depositing terminal, the check deposit transaction receipt in a Web server;

obtaining, by the self-service check depositing terminal, a Uniform Resource Locator (URL) associated with the check deposit transaction receipt stored in the Web server;

printing, by the self-service check depositing terminal, an acknowledgement receipt which contains a notification that the check deposit transaction receipt can be obtained by going to the URL and retrieving the check deposit transaction receipt from the Web server; and delivering, by the self-service check depositing terminal, the printed acknowledgment receipt to the depositor at the self-service check depositing terminal to notify the depositor that the check deposit transaction receipt can be obtained by going to the URL and retrieving the check deposit transaction receipt from the Web server.

4. A method of the self-service check depositing terminal according to claim 3, wherein the acknowledgment receipt contains information about the check deposit transaction.

5. A method of operating a self-service check depositing terminal when a depositor is conducting a check depositing transaction at the self-service check depositing terminal, the method of the self-service check depositing terminal comprising:

receiving, by the self-service check depositing terminal, one or more checks from the depositor;

generating, by the self-service check depositing terminal, a check deposit transaction receipt associated with the check deposit transaction;

presenting, by the self-service check depositing terminal, a screen on a display to the depositor to enable the depositor to select a delivery channel for receiving the check deposit transaction receipt; and delivering, by the self-service check depositing terminal, the check deposit transaction receipt to the depositor via the selected delivery channel.

6. A method of the self-service check depositing terminal according to claim 5, wherein the selected delivery channel comprises a mode of electronic mail (email).

7. A method of the self-service check depositing terminal according to claim 5, wherein the selected delivery channel comprises a Uniform Resource Locator (URL) by which the depositor can go to obtain the check deposit transaction receipt.

8. A method of operating a self-service check depositing terminal when a depositor is conducting a check depositing transaction at the self-service check depositing terminal, the method of the self-service check depositing terminal comprising:

receiving, by the self-service check depositing terminal, a customer identification card from the depositor;

reading, by the self-service check depositing terminal, data from the customer identification card received from the depositor;

receiving, by the self-service check depositing terminal, one or more checks from the depositor;

generating, by the self-service check depositing terminal, a check deposit transaction receipt associated with the check deposit transaction;

based upon the data read from the customer identification card received from the depositor, identifying, by the self-service check depositing terminal, a delivery channel for delivering the check deposit transaction receipt to the depositor; and delivering, by the self-service check depositing terminal, the check deposit transaction receipt to the depositor via the identified delivery channel.

9. A method of the self-service check depositing terminal according to claim 8, wherein the identified delivery channel comprises a mode of electronic mail (email).

10. A method of the self-service check depositing terminal according to claim 8, wherein the identified delivery channel comprises a Uniform Resource Locator (URL) by which the depositor can go to obtain the check deposit transaction receipt.

* * * * *